United States Patent [19]

Hattori et al.

[11] 4,290,398
[45] Sep. 22, 1981

[54] IGNITION TIMING CONTROL SYSTEM FOR INTERNAL COMBUSTION ENGINE

[75] Inventors: Tadashi Hattori, Okazaki; Kenji Goto, Susono; Daisaku Sawada, Susono; Takashi Shigematu, Susono; Hiroaki Yamaguchi, Anjo; Minoru Nishida, Okazaki; Teruyoshi Ito, Kariya, all of Japan

[73] Assignees: Nippondenso Co., Ltd., Kariya; Nippon Soken, Inc., Nishio; Toyota Jidosha Kogyo Kabushiki Kaisha, Toyota, all of Japan

[21] Appl. No.: 30,933

[22] Filed: Apr. 17, 1979

[30] Foreign Application Priority Data

Apr. 24, 1978 [JP] Japan .................................. 53-49094

[51] Int. Cl.$^3$ ................................................ F02P 5/04
[52] U.S. Cl. .................................... 123/425; 123/415; 123/427
[58] Field of Search ....... 123/117 R, 117 D, 146.5 A, 123/148 E, 119 ED; 73/35

[56] References Cited

U.S. PATENT DOCUMENTS

| | | | |
|---|---|---|---|
| 3,942,359 | 3/1976 | Arrigoni et al. | 73/35 |
| 4,002,155 | 1/1977 | Harned et al. | 123/148 E |
| 4,120,272 | 10/1978 | Douaud et al. | 123/148 E |
| 4,153,019 | 5/1979 | Laubenstein et al. | 123/117 R |
| 4,153,020 | 5/1979 | King et al. | 123/146.5 A |
| 4,211,194 | 7/1980 | Hattori et al. | 123/427 |

Primary Examiner—Charles J. Myhre
Assistant Examiner—Andrew M. Dolinar
Attorney, Agent, or Firm—Cushman, Darby & Cushman

[57] ABSTRACT

An ignition timing control system for an internal combustion engine in which an angular position of the internal combustion engine is detected, and on the basis of the signal thus obtained by detection, the ignition timing of the internal combustion engine is determined by calculation in a computing device. A knocking condition is judged by a detection signal produced from a knocking detector of the internal combustion engine, and the ignition timing is corrected by the judgement of knocking. In view of the fact that the knocking occurs only during a certain period of the driving cycle of the internal combustion engine, a knocking condition is judged by comparing a detection signal produced from the knocking detector during the time in the absence of knocking with a detection signal produced during the time in the presence of knocking.

11 Claims, 11 Drawing Figures

IGNITION TIMING CONTROL SYSTEM FOR INTERNAL COMBUSTION ENGINE

BACKGROUND OF THE INVENTION

Field of the Invention

The present invention relates to an ignition timing control system for the internal combustion engine in which by means of vibrations or noise occurring in or outside of the cylinder due to the pressure in the cylinder a knocking condition is detected, and the ignition timing angle is delayed in response to a knocking signal.

DESCRIPTION OF THE PRIOR ART

The ignition timing of an internal combustion is required to be determined according to the engine conditions in a manner to assure the optimum operation of the engine. Conventionally, it is usual that the ignition timing control systems are such that the engine speed is detected by a centrifugal angle advancing mechanism and the negative intake pressure is detected by a vacuum angle advancing mechanism respectively to represent the condition of the engine by the engine speed and negative intake pressure, and the ignition timing is determined.

It is well known that for an improved engine efficiency and saving of fuel, the best result is obtained if ignition occurs at or in the vicinity of the minimum advance for best torque (MBT). In view of this, the ignition timing is required to be changed to occur at MBT in accordance with the engine conditions.

Under certain engine conditions, however, as the ignition timing is advanced a knocking occurs and a stable engine operation becomes impossible. Generally, the relation between MBT and the ignition timing associated with knocking is such that the knocking limit arrives before MBT under low speed operation or a small load. The knocking limit is easily affected by atmospheric conditions including temperature and humidity. The conventional ignition timing control systems are programmed in such a manner that ignition timing is considerably delayed behind MBT on the basis of such parameters as the engine speed and negative intake pressure to prevent knocking over the entire operating range. As a result, the engine output and fuel saving ability are lower than a performance level which otherwise might be attained.

Figure 1:
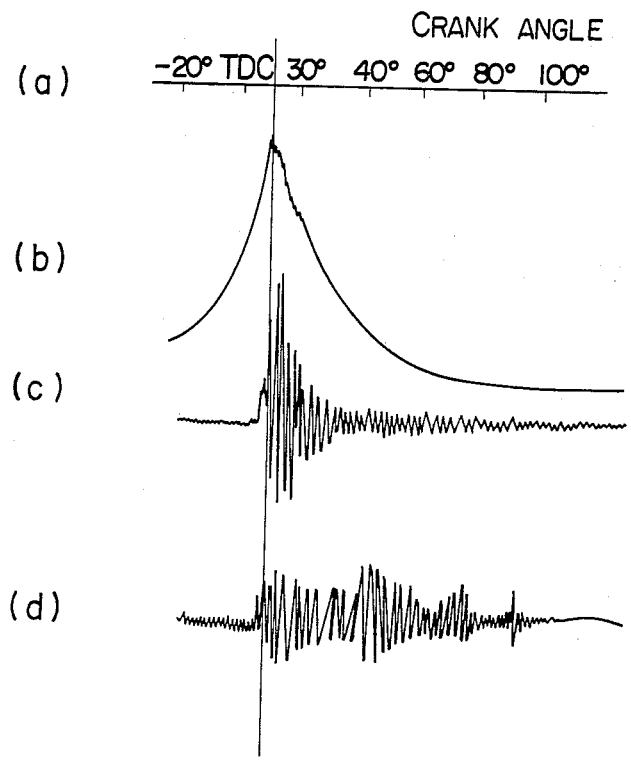
FIG. 1 shows waveforms for explaining the knocking signal of the internal combustion engine.

It is generally known that the ignition timing has a close relation with the pressure in the cylinder (cylinder pressure). In the absence of knocking, the cylinder pressure, at the time of explosion of the mixture gas, is not superimposed with any high harmonics (generally, of frequencies ranging from 5 KHz to 10 KHz which depend on the engine bore diameter and the sound speed at the time of combustion and which is caused by intermittent abrupt combustion of fuel). Once the knocking occurs, however, the high harmonics begin to be superimposed at or in the vicinity of the maximum value of the cylinder pressure as shown in FIG. 1, with the result that a vibration or noise is generated outside of the cylinder. A careful study of the signal representing the internal pressure of the cylinder and vibrations occurred outside of the cylinder shows that the beginning of knocking (trace knocking) occurs at the engine crank angle of maximum cylinder pressure and as the knocking increases gradually to cause a large knocking (heavy knocking), the high harmonics are displaced considerably in advance of the maximum cylinder pressure (i.e., toward ignition side). Vibrations and noise are resonated with other vibration systems through the high harmonics contained in the cylinder pressure so that a vibration waveform is transmitted to the gas exhaust process. This is especially conspicuous when a large knocking is involved. In FIG. 1, (a) shows the crank angle (°CA), (b) cylinder combustion pressure, (c) and (d) the cylinder pressure and cylinder vibration waveforms respectively obtained after filtering by the band-pass filter of 5 to 10 KHz.

A very effective knocking preventive system which is advantageous both in output and fuel saving is disclosed by U.S. Pat. No. 4,002,155. According to such a system, occurrence of knocking is detected by a knocking detector circuit and by an ignition angle advance computing circuit, and ignition is delayed behind the programmed ignition timing. In this way, the engine is programmed to the best ignition timing for each engine condition, while ignition is caused at or in the vicinity of the knocking limit only at the time of a knocking. In this well-known system, a reference value for judgment of occurrence of a knocking is set by monitoring vibrations of the engine base. Since the engine base vibrations are monitored over the period from ignition to engine rotation to a certain angle, a sensor is required for detecting a certain small angle of rotation in addition to a sensor for detecting the engine reference rotational position.

SUMMARY OF THE INVENTION

An object of the present invention is to provide an ignition timing system for the internal combustion engine, wherein noting the fact evidenced by the various experiments that no knocking occurs and therefore no vibration or noise due to high harmonics attributed to the knocking occurs during the period of delayed ignition immediately after ignition, on the basis of the cycle signal generated for each ignition cycle, a signal associated with base vibrations and noise generated during a certain length of time in the period of ignition delay is picked up and compared with the signals of subsequent vibrations and sounds, making it possible to detect the knocking over a wide range of engine conditions, also, signals representing base vibrations and sounds are detected without detecting a rotational angle, and to provide a very simple and accurate control.

According to the present invention, a knocking is detected by a knocking detector and the ignition timing is changed to the delay side to prevent the knocking from being aggravated. This makes it possible to keep the ignition timing delay less than the detected knocking level, and therefore the ignition timing is programmed at the optimum point suitable for the engine conditions. As a result, the vehicle steering is not disturbed by the knocking on the one hand and the output and the fuel saving ability are improved on the other hand. Further, in view of the fact that a knocking occurs only during a certain period of engine operation cycle, a knocking is judged by comparing a signal generated during the time in which the knocking does not occur with a signal generated during the time in which the knocking may occur. A division signal for such a certain period is obtained on the basis of the conventional cycle signal generated for each ignition cycle. As a result, a knocking is discriminated easily and accurately without using any new crank angle signal (for detection of crank angle associated with the knocking), thus leading to a great practical advantage.

DESCRIPTION OF THE PREFERRED EMBODIMENTS

Figure 2:
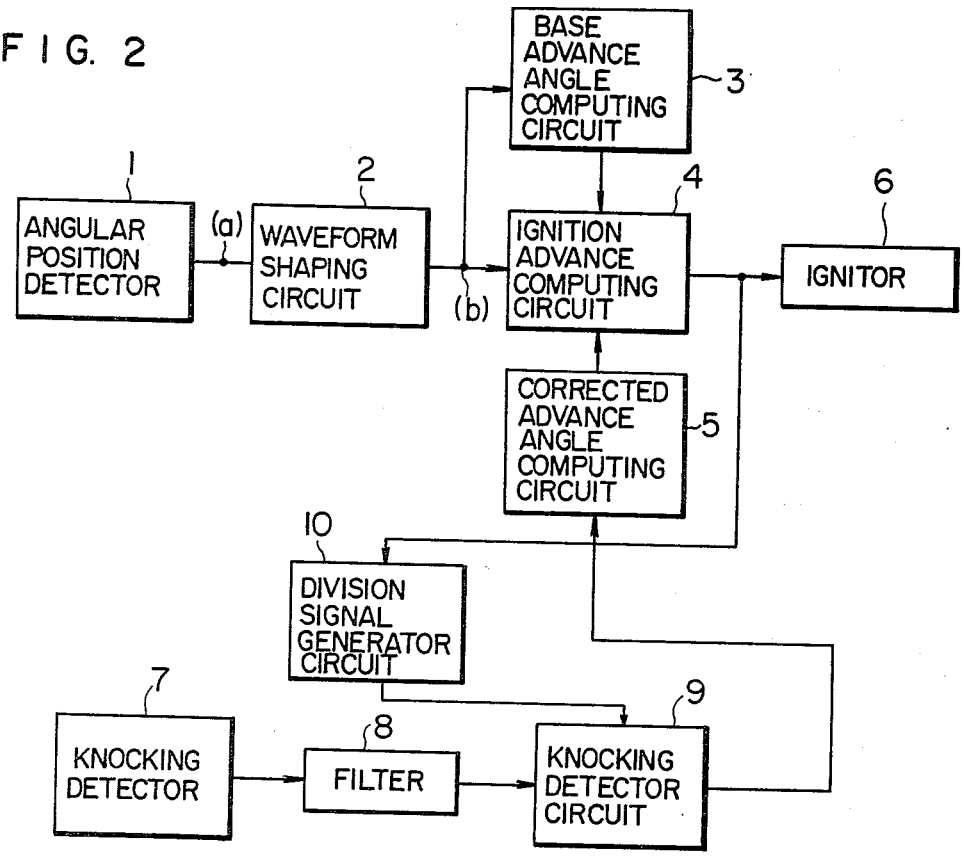
FIG. 2 is a block diagram showing an embodiment of the system according to the present invention.

The present invention will be described below with reference to the embodiments shown in the drawings. A block diagram of the system according to the present invention is shown in FIG. 2. Reference numeral 1 designates an angular position detector including an electromagnetic pickup etc., which pickup is for detecting the reference angular position of the crank shaft of the 4-cylinder 4-cycle internal combustion engine, numeral 2 a waveform shaping circuit for shaping the output signal waveform of the angular position detector 1, and numeral 3 a base advance angle computing circuit for computing the base advance angle which is set beforehand according to the engine conditions. In this embodiment, the base advance angle is calculated with the engine speed as a parameter. Numeral 4 designates an ignition advance angle computing circuit for determining the ignition timing in response to the output signals of the base advance angle computing circuit 3 and the correction advance angle computing circuit designated by 5, and numeral 6 designates a well-known ignitor for current-amplifying the output signal of the ignition advance angle computing circuit 4 to energize and deenergized the ignition coil (not shown). Numeral 7 designates a knocking detector for detecting vibrations of the engine body corresponding to the engine knocking or a sound wave generated by such vibrations by means of a piezoelectric element or by means of a power-generating magnet and a coil. Numeral 8 designates a bandpass filter to which the output signal of the knocking detector 7 is applied. The band pass filter 8 generally has a frequency band suitable to the engine which frequency band is within the frequency range from 5 to 10 KHz generated only by the knocking vibrations. Numeral 9 designates a knocking detector circuit for judging whether a knocking condition has occurred or not from the high frequency signal passed through the band pass filter 8. Numeral 10 designates a division signal generator circuit for producing a timing signal (division signal) required for the knocking detector circuit 9.

Next, the detailed circuits of the present invention shown in FIGS. 3 and 4 will be explained with reference to FIG. 5. In the ignition advance angle computing circuit 4 shown in FIG. 3, a pair of fixed resistors (not shown) are connected in series between the power supply and the earth and, by the dividing point thereof, the reference voltage $V_{ref}$ is generated and connected to an operational amplifier described below through a bias resistor. The ignition advance angle computing circuit 4 further includes a NOT circuit 41, dividing resistors 42, 43 for determining the potential for discharge control, analog switches 44, 45, 46 turned on in response to a "1" signal, charging resistors 47, 48, a discharging resistor 49, bias resistors 410, 411 connected to the reference voltage $V_{ref}$, an input resistor 412, operational amplifiers 413, 414, a capacitor 415, and an AND circuit 416. The resistors 47, 48, 49, 410, the capacitor 415 and the operational amplifier 413 constitute a Miller integrator circuit. When the input voltage is lower than the reference voltage $V_{ref}$, the capacitor 415 is charged, while when the input voltage is higher than $V_{ref}$, the capacitor 415 is discharged. The resistors 411, 412 and the operational amplifier 414 constitute a comparator circuit. The analog switches 44, 45 and 46 are each preferably comprised of a field effect transistor.

The angular position detector 1, which is well-known and not shown in detail, is fixed on the distributor shaft of the 4-cylinder internal combustion engine and includes a rotor having four protrusions at equal intervals on the outer periphery thereof and an electromagnetic pickup positioned in opposed relation with the rotor protrusions. The rotor makes one rotation for each two rotations of the crank shaft. The electromagnetic pickup generates a signal as shown in (a) of FIG. 5 which is reduced to the earth level when each protrusion of the rotor crosses the electromagnetic pickup, and this output signal of the electromagnetic pickup makes up the output signal of the angular position detector 1. The output signal of the angular position detector 1 is applied to the waveform shaping circuit 2 including a comparator circuit and is compared with a reference voltage of the earth potential to produce a rectangular wave signal shown in (b) of FIG. 5. Here, the angular positions M1 and M2 of the crank shaft with respect to each cylinder are detected by the rectangular wave.

Figure 3:
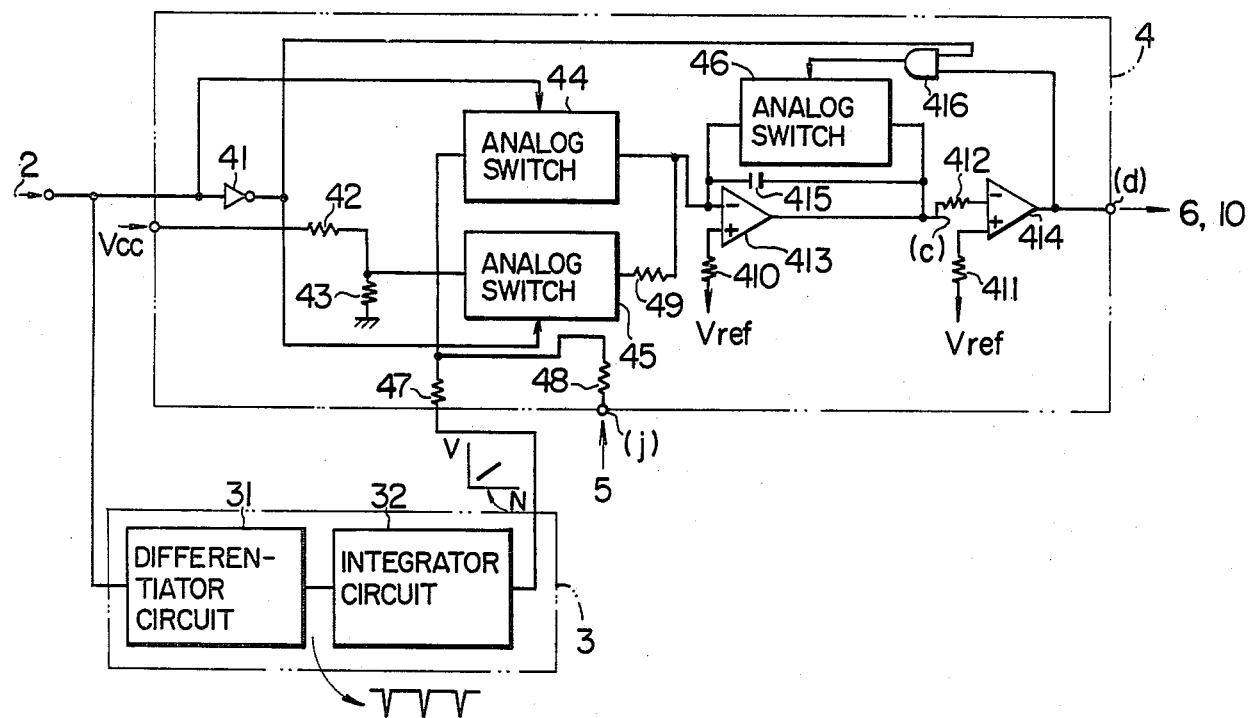
FIGS. 3 and 4 are electrical circuit diagrams showing an embodiment of the circuits of the essential parts of the system according to the present invention shown in FIG. 2.

The base advance angle computing circuit 3 includes a differentiator circuit 31 and an integrator circuit 32 as shown in FIG. 3. The output signal of the waveform shaping circuit 2 is applied to the integrator circuit 32 via the differentiator circuit 31, thus producing an analog voltage which increases in accordance with the increase of the number of revolutions N, which voltage is applied to the charging resistor 47 of the ignition advance angle computing circuit 4. The other charging resistor 48 of the ignition advance angle computing circuit 4 is connected to the corrected advance angle computing circuit 5.

Figure 4:
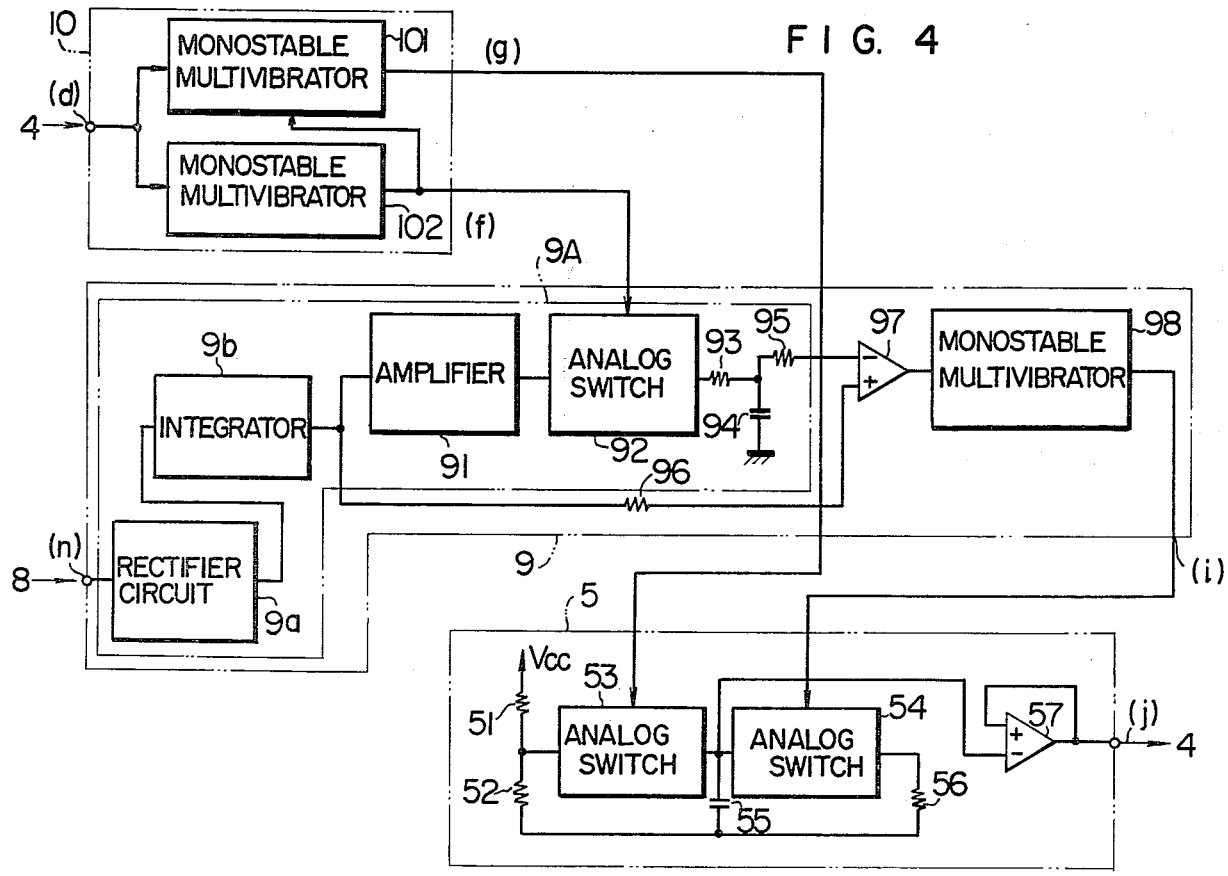

Referring to FIG. 4, the division signal generator circuit 10, the knocking detector circuit 9 and the corrected lead angle calculator circuit 5 will be explained. The division signal generator circuit 10, to which an output signal of the ignition advance angle computing circuit 4 is applied, includes monostable multivibrator circuits 101 and 102. The monostable multivibrator circuit 102 produces a signal with the time width or duration $\tau_1$ ("1" level for the duration of $\tau_1$) at the time of rise of the output signal of the ignition advance angle computing circuit 4 as shown in (f) of FIG. 5, while the monostable multivibrator 101 produces a signal (g) with the time width $\tau_2$ ("1" level for the duration of $\tau_2$) as shown in (g) of FIG. 5 at the time of fall of the output of the monostable multivibrator 102.

Figure 5:
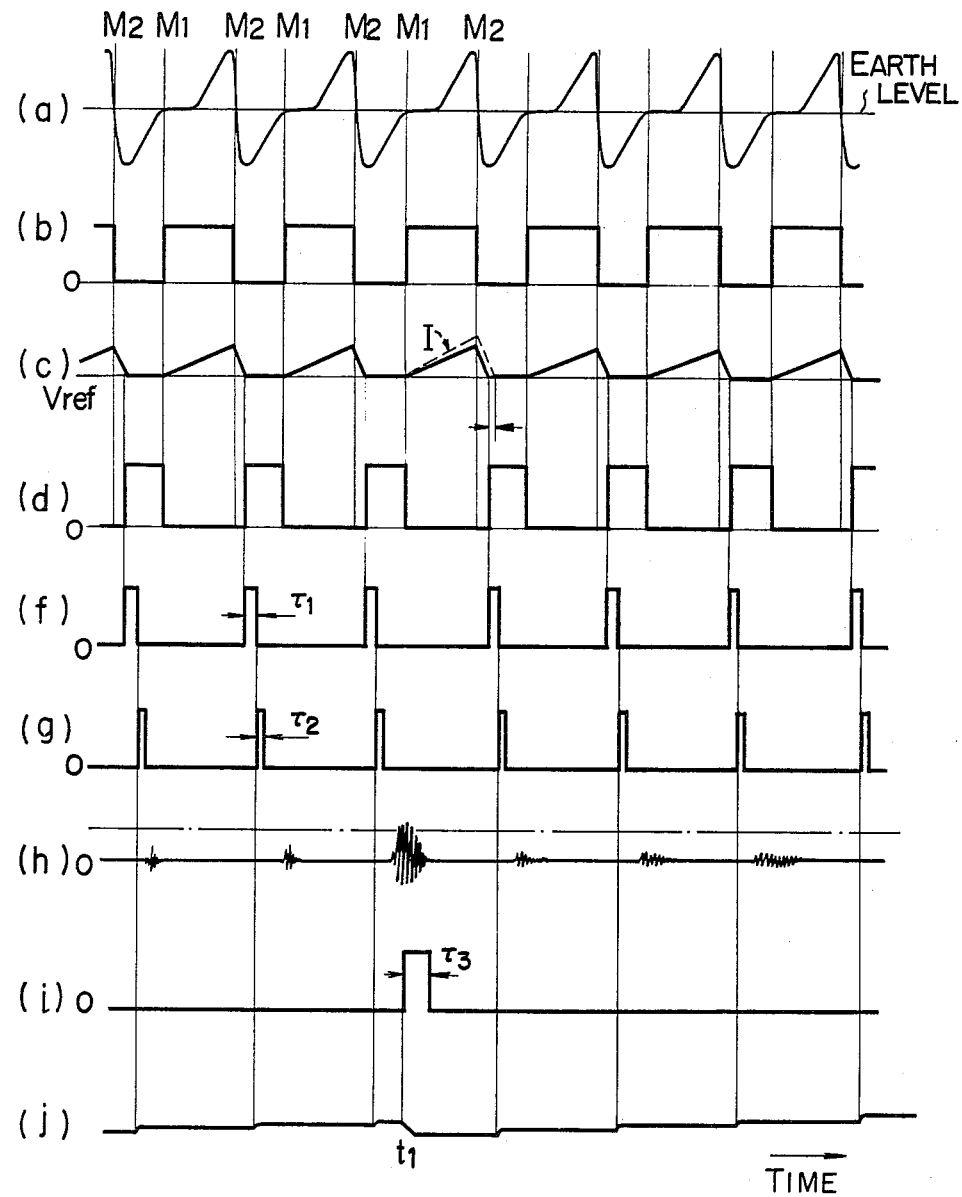
FIG. 5 shows waveforms for explaining the operation of the system according to the present invention shown in FIG. 2.

The knocking detector circuit 9 is impressed with a vibration waveform with a set band width (7 to 10 KHz in this embodiment) as shown in (h) of FIG. 5 which is passed through the knocking detector 7 and the band pass filter 8. The knocking detector circuit 9 includes a rectifier circuit 9a for full-wave or half-wave rectification of the input signal, an integrator for integrating and averaging the output of the rectifier circuit 9a, an amplifier 91 for amplifying the signal of the integrator 9b to a level K times larger, an analog switch 92, a hold circuit (including resistors 93, 95 and capacitor 94), a comparator circuit 97 for comparing the output of the hold circuit with the input signal obtained through the resistor 96, and a monostable multivibrator 98. The output potential of the amplifier 91 produced when the analog switch 92 is turned on for the time $\tau_1$ is charged to the capacitor 94 of the hold circuit. An average value producing circuit 9A includes the rectifier circuit 9a, the integrator 9b, the amplifier 91, the analog switch 92, the resistors 93, 95 and the capacitor 94. The output signal of the hold circuit is K times larger than the original signal. When the input signal of the integrator 9b is higher than the output signal of the hold circuit, the comparator circuit 97 produces a "1" signal. The monostable multivibrator 98 produces an output signal shown in (i) of FIG. 5 with time width $\tau_3$ at the rise time of the output of the comparator circuit 97 to "1" level. In other words, when the input signal becomes higher than the value held at width $\tau_1$, the output signal with time width $\tau_3$ is produced.

The correction advance angle calculator circuit 5 includes resistors 51, 52, 56, analog switches 53, 54, a capacitor 55, and an operational amplifier 57. One end of the resistor 51 is connected with the positive side of the power supply (Vcc). The capacitor 55 is charged only during the time $\tau_2$ when the analog switch 53 is closed. On the other hand, the capacitor 55 is discharged with the analog switch 54 closed only when an output pulse is produced from the knocking detector circuit 9, so that the capacitor potential is decreased. The operational amplifier 57 includes an emitter-follower circuit for current amplification.

Next, the operation of the above-mentioned detailed embodiment will be described with reference to the engine condition or condition of engine operation. The angular position detector 1 produces a rectangular pulse through the waveform shaping circuit 2 in synchronism with the rotation of the crank shaft of the internal combustion engine. The output signal of "1" level and that of "0" level are produced during the period from M1 to M2 and that from M2 to M1 respectively at the output terminal b as shown in (b) of FIG. 5. Two such pulses are produced for every one rotation of the engine crank shaft. When the output of the waveform shaping circuit 2 reaches "1", the analog switch 44 of the ignition advance angle computing circuit 4 is turned on. Under this condition, since the output of the NOT circuit 41 is "0" the analog switch 45 is turned off. Also, since the output signal of the AND circuit 416 is "0" and the analog switch 46 for resetting the capacitor is off, the capacitor 415 is charged, as shown in (c) of FIG. 5, from the time point M1 starting from the reference potential $V_{ref}$ in response to the input voltage of the charging resistors 47 and 48. Charging of the capacitor 415 causes the output of the operational amplifier 413 to become higher than the reference voltage $V_{ref}$, and therefore the output of the comparator circuit is reduced to "0" as shown in (d) of FIG. 5.

At the time point M2 when the signal at the output terminal of the waveform shaping circuit 2 is reduced to "0", the analog switch 44 is turned off and the analog switch 45 is turned on at the same time, thus, a certain discharge current in response to the output of the dividing resistors 42 and 43 for discharge control begins to flow in the capacitor 415 as shown in (c) of FIG. 5. At the time of completion of the discharge of the capacitor 415, the output of the operational amplifier 413 is lower than the reference voltage $V_{ref}$, and therefore the output of the comparator circuit is reversed as shown in (d) of FIG. 5 to "1" level, so that the output of the AND circuit 416 becomes "1". Thus the analog switch 96 is turned on, and the output of the operational amplifier 413 is maintained constant at reference voltage $V_{ref}$ as shown in (c) of FIG. 5. The signal at the output terminal of the ignition advance angle computing circuit 4 is applied to the ignitor 6. At the time of the rise point of this signal, an ignition spark is generated. This rise point is determined by the charge/discharge current of the capacitor 415. In the case under consideration, however, since the discharge current is set to be constant, the rise point is determined only by the charge current. With the increase in charge current, the charging potential is increased as shown by the dashed line I in (c) of FIG. 5, therefore, the output of the comparator 414 rises more toward the delayed side than when the charge current is smaller. In other words, the ignition timing is delayed in angle. When the charge current is decreased, on the other hand, the charging potential lowers and the ignition timing angle is advanced accordingly.

The charge current is determined by the potential across the charge resistors 47 and 48 constituting an adder circuit. Assuming that, e.g., the output voltage of the correction advance angle computing circuit 5 is constant. The rise time point of the comparator 414 is changed by the output potential of the base advance angle computing circuit 3. In this case, the output potential of the base advance angle computing circuit 3 is increased, i.e., the charge current of the capacitor 415 decreases in accordance with the number of revolutions, so that the rise time point is advanced in accordance with the increase in the number of revolution. In other words, by programming the base advance angle computing circuit 3 beforehand, the advance angle may be determined as desired. In the case where the output voltage of the base advance angle computing circuit 3 is constant, on the other hand, the angle delay or advance is determined by the output potential of the correction advance angle computing circuit 5. Thus, in accordance with the increase or decrease in output potential, the ignition timing is advanced or delayed, respectively. It should be remembered that at the time of discharge, the reference potential due to the dividing resistors 42 and 43 is required to be higher than $V_{ref}$ so that the dividing resistor impedance is smaller than the discharge resistor 49; while during the charging, the sum of the potential across the resistors 47, 48 and the output potential of the base advance angle computing circuit 3 and the correction advance angle computing circuit 5 is required to be lower than $V_{ref}$. Also, the quantities of the base advance angle and correction advance angle are weighted by the resistors 47 and 48.

Figure 9A:
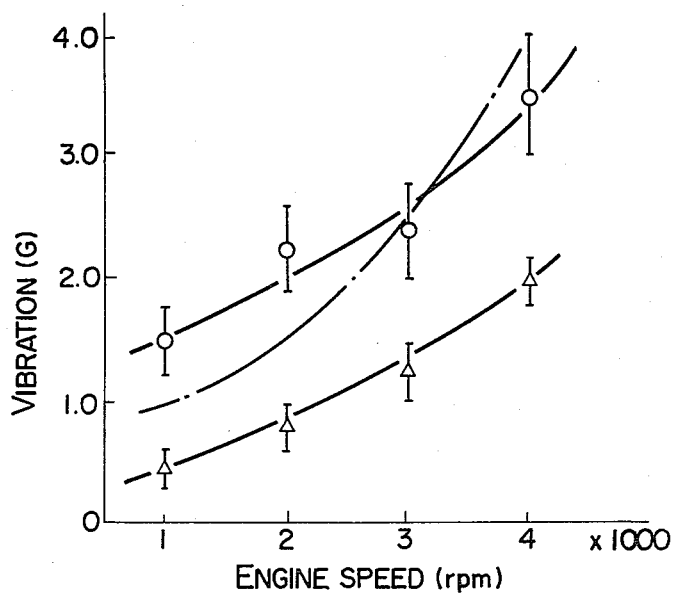
FIGS. 9a and 9b are characteristic diagrams showing the relation between the knocking intensity and the engine conditions in the system according to the present invention.
Figure 9B:
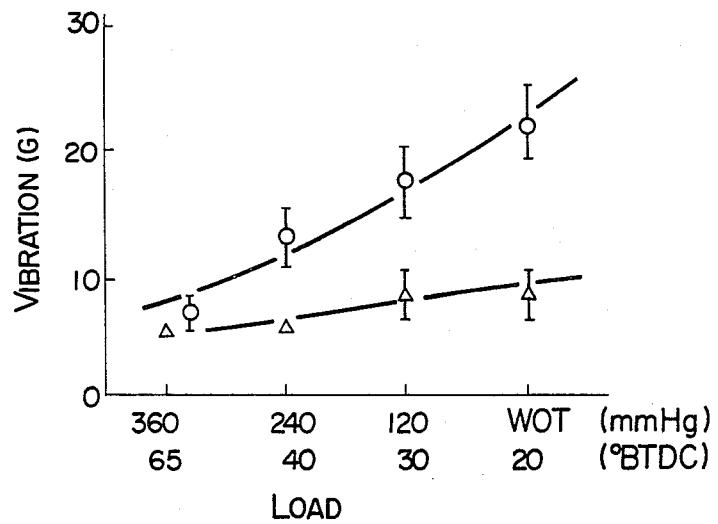

In the knocking detector circuit 9, the capacitor 94 holds a voltage K times higher than the average voltage of the base vibration waveform within the time $\tau_1$ of (f) in FIG. 5 from the time point of ignition. The value thus held is compared with the output value of the integrator 9b. In the absence of a knocking, the held value is higher, while in the presence of a knocking the output value of the integrator 9b becomes higher than the held value at or after the top dead center, and the output of the comparator circuit 97 is inverted to positive, so that a knocking pulse with the width $\tau_3$ is produced from the monostable multivibrator 98 as shown in (i) of FIG. 5. In this case, the setting of K depends on the type of internal combustion engine. Representative characteristics of the base vibration level (marked with $\Delta$) and the vibration output at the time of trace knock (marked with o) are shown in FIGS. 9a and 9b. If the value K is kept constant at 2 on the one-dot chain in FIG. 9a, detection is possible during low speed revolutions, while knocking more than the trace knocking is detected at high revolution speeds. The value K, therefore, is preferably regulated at an optimum level in accordance with engine conditions for the purpose of accurate detection. $\tau_1$ shows the time width for determining the advance angle of the capacitor 55 at a time. The results of various tests show that this time width is required to be shorter than 3 msec from ignition because no knocking vibrations occur during the 3 msec from ignition to the piston arrival at or near the top dead center. If $\tau_1$ is to be expressed by an angle, the results of various tests show that selection of $\tau_1$ to be within 60 degrees in crank shaft angle from ignition is proper.

Next, the correction advance angle computing circuit 5 will be explained below. In the absence of knocking, during the time $\tau_2$, only the analog switch 53 is turned on, and the capacitor 55 is charged by the division voltage V of the resistors 51 and 52, so that the terminal voltage of the capacitor 55 increases. Thus the output of the voltage follower circuit comprised of the operational amplifier 57 also increases. As a result, the output of the correction advance angle computing circuit 5 also increases as shown in (j) of FIG. 5. The output c, i.e., the charge current in the integrator circuit of the ignition advance angle computing circuit 4 is decreased, so that the ignition timing advances more than the programmed value. When knocking occurs, on the other hand, the analog switch 54 is turned on and the charges in the capacitor 55 are released through the resistor 56, with the result that the output potential of the correction advance angle computing circuit drops as shown at $t_1$ in (j) of FIG. 5. The charge current of the capacitor 415 of the integrator circuit in the ignition advance angle computing circuit 4 is increased, thereby delaying the ignition timing. When the knocking ceases due to the delaying of the ignition timing, only the analog switch 53 is turned on and the capacitor 55 is charged again, thereby advancing the ignition timing. As described above, in the presence of knocking the ignition timing is delayed, while when the knocking ceases the ignition timing is again advanced, and in this way, the ignition timing is regulated to the advanced side avoiding knocking. The advance or delay angle to be corrected at a time is determined by the resistors 51, 52, 56 and the time widths $\tau_2$ and $\tau_3$.

Figure 6:
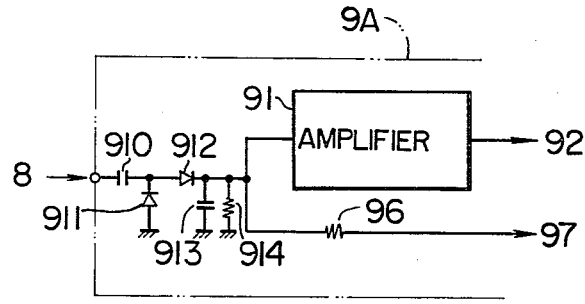
FIGS. 6, 7 and 10 are electrical circuit diagrams showing other embodiments of the circuits of the essential parts of the system according to the present invention illustrated in FIG. 2.

The foregoing embodiment refers to the case in which the base signal for the knocking detection signal is obtained from the output of the integrator 9b during the time $\tau_1$. In FIG. 6, on the other hand, the output signal of the band pass filter 8 is detected in the form of a preprocessed rectified and averaged waveform. In this case, the output of the band pass filter 8 is applied directly to a voltage doubler rectification-averaging circuit including capacitors 910, 913, diodes 911, 912 and a resistor 914 and coupled to the amplifier 91 and the resistor 96, thus performing computation similar to the foregoing case. The embodiment under consideration is more preferable since noise signals such as ignition noise are reduced, although the time constant for averaging process is more difficult to determine.

Figure 7:
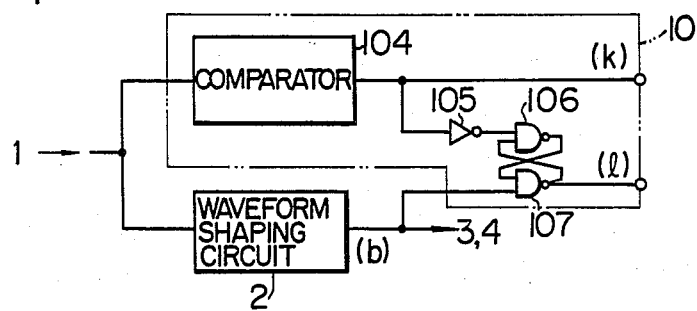
Figure 8:
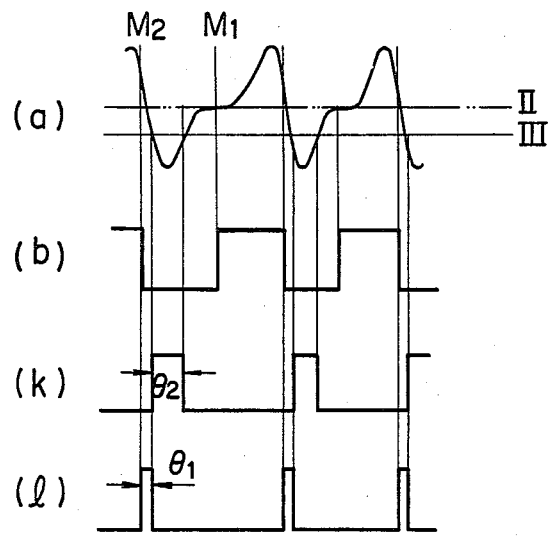
FIG. 8 shows waveforms for explaining the operation of the circuit of FIG. 7.

Further, instead of generating the timing signals such as $\tau_1$ and $\tau_2$ from the output signal (actual ignition timing signal) of the ignition advance angle computing circuit 4, the output signal of the waveform shaping circuit 2 may be applied in reversed form directly to the division signal generator circuit 10 to generate a timing signal. In this case, the width of $\tau_2$ is required to be corrected by the angle of M2. Also, without generating the timing signals $\tau$ and $\tau_2$ on the basis of time, they may alternatively be generated on the basis of angle with equal effect. In FIGS. 7 and 8, the signal (k) which becomes "1" at the time point $\theta_1$ behind the M2 and is reduced to "0" after the lapse of $\theta_2$ is generated by a comparator circuit 104 in which the angle detection signal (a) of FIG. 8 is set at (III) (set at (II) in the case of the waveform shaping circuit 2). The signal thus generated is applied to a logic circuit including the NOT circuit 105 and NAND circuits 106 and 107 constituting a flip-flop, thus generating the timing signals $\theta_2$ and $\theta_1$ shown in (k) and (l) of FIG. 8 which are connected to respective coupling elements. In this case, too, as in the preceding case, the angle setting is required to be corrected by the angular position of $M_2$.

Figure 10:
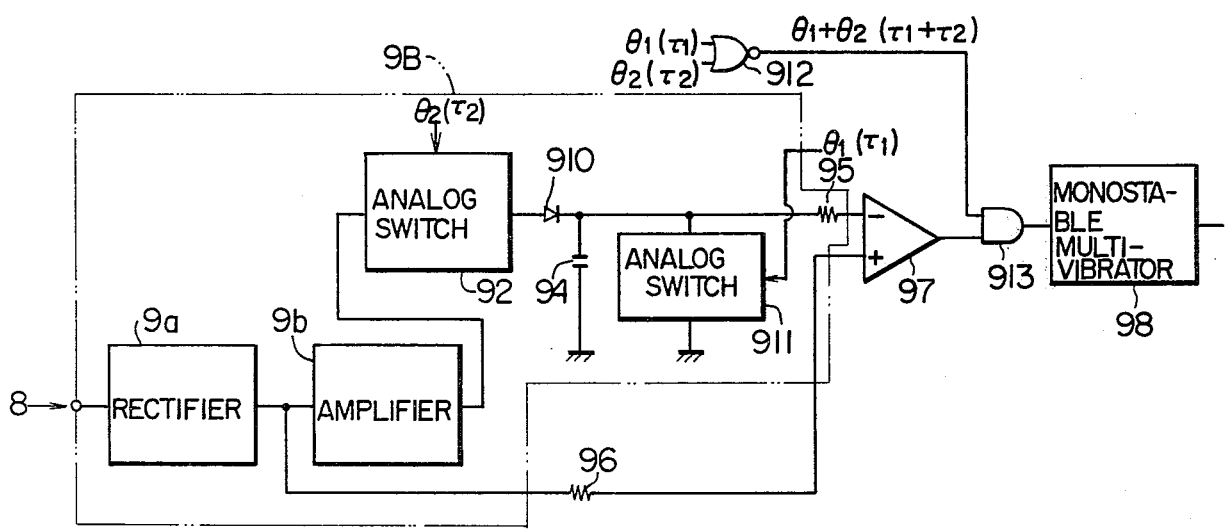

Another embodiment of the knocking detector circuit 9 is shown in FIG. 10. The average value producing circuit 9A used in the circuit of FIG. 4 is replaced in this embodiment by a peak value producing circuit 9B comprising a rectifier circuit 9a, an amplifier 9b, an analog switch 92, and a peak hold circuit (including a diode 910, a capacitor 94, an analog switch 911 and a resistor 95). The output of the comparator 97 is applied to one input terminal of the AND circuit 913, and to the other input terminal thereof the output of the NOR circuit 912 is connected. The output of the AND circuit 913 is applied to the monostable multivibrator 98. To the control electrode of the analog switch 911 and also to one of the input terminals of the NOR circuit 912 the timing signal $\theta_1$ shown in (l) of FIG. 8 is applied. To the control electrode of the analog switch 92 and to the other input of the NOR circuit 912 the timing signal $\theta_2$ shown in (k) of FIG. 8 is applied. Here, the timing signal $\theta_1$ may be one with a short pulse duration which is only sufficient for discharging the charges of the capacitor 94, while the timing signal $\theta_2$ may have only such a pulse width before the top dead center that it continues not until 60 degrees in crank angle after ignition.

Operation of the knocking detector circuit 9 shown in FIG. 10 will be described. First, the analog switch 911 is turned on by the timing signal $\theta_1$, thus discharging the charges of the capacitor 94. The analog switch 92 is turned on by the timing signal $\theta_2$, and during the period when the analog switch 92 is turned on, the peak value which is K times the base vibration waveform applied from the knocking detector 7 through the band pass filter 8 is held in the capacitor 94 through the rectifier 9a, amplifier 9b, analog switch 92 and diode 910. The value thus held is compared with the output value of the rectifier circuit 9a. When knocking occurs, the output value of the rectifier circuit 9a exceeds the value held at or after the top dead center, and the output of the comparator 97 becomes positive, so that a knocking pulse with predetermined width is generated at the monostable multivibrator 98. The timing signals $\theta_1$ and $\theta_2$ are applied to NOR circuit 912. As long as either one of the timing signals $\theta_1$ and $\theta_2$ is generated, the gate of AND circuit 913 is closed, so that the output of the comparator circuit 97 is prevented from being applied to the monostable multivibrator 98, thus preventing any erroneous actuation during charging or discharging of the capacitor 94.

In the circuit of FIG. 10, it is of course possible to use the timing signals $\tau_1$ and $\tau_2$ determined by time instead of the timing signals $\theta_1$ and $\theta_2$ determined by angle. In this case, the timing signal $\tau_1$ may have a short pulse width which is only sufficient to discharge the charges of the capacitor 94, and the timing signal $\tau_2$ may be a signal of the pulse width such that the signal is produced and disappears within 3 msec after ignition.

When the circuit of FIG. 10 is used, the timing signal $\theta_1$ or $\tau_1$ applied to the control electrode of the analog switch 911 is applied to the control electrode of the analog switch 53 of the corrected advance angle calculator circuit 5.

In the foregoing embodiments, the vibrations of the internal combustion engine are detected on the basis of knocking vibrations. In place of such a method, the engine vibrations may be detected in the form of vibration sound through a microphone.

Although in the foregoing embodiments the base advance angle is based only on the number of revolutions, the base advance angle program may be formed by any one or combination of such parameters of engine conditions as intake pressure, intake air amount, engine warm-up conditions and acceleration etc.

In the above-mentioned embodiments, the output signal of the correction advance angle computing circuit 5 is also applied to the ignition advance angle computing circuit 4, so that the actual ignition timing is determined on the basis of the output signal of the correction advance angle computing circuit 5 and the signal associated with engine conditions for determining a reference ignition timing supplied from the base advance angle computing circuit 3. Instead of such a method, the signal associated with the engine conditions for determining a reference ignition timing may be used to generate a reference trigger signal at ignition timing beforehand, so that at a time delayed behind the reference trigger signal, the delay circuit is actuated in response to the presence or absence of knocking, thus generating an actual ignition timing signal. Such a system for generating a reference trigger signal at a reference ignition timing beforehand is not necessarily constituted electronically but may be of a mechanical configuration including a well-known governor angle advancing device or vacuum angle advancing device. In such a system for generating a reference trigger signal at a reference ignition timing beforehand, the timing signals $\tau_1$ and $\tau_2$ may be produced on the basis of the reference trigger signal.

We claim:

1. An apparatus for controlling a timing of ignition sparks supplied to an internal combustion engine having an output shaft comprising:

position detecting means for producing a reference position signal synchronized with the arrival of said output shaft at a predetermined reference position;

computing means for computing an ignition position relative to said reference position signal in response to operating conditions of said internal combustion engine, said computing means producing an ignition signal synchronized with the arrival of said output shaft at said ignition position;

knock detecting means for producing knock signals having magnitudes proportional to respective intensities of knocks of said internal combustion engine;

averaging means for averaging the magnitudes of said knock signals, interval control means responsive to said ignition signal for limiting the operation of said averaging means to a predetermined constant interval of time measured with respect to the occurrence of said ignition signal, said constant interval of time being independent of the angle of output shaft rotation made by the engine therein;

comparing means for comparing the magnitudes of said knock signals with an average magnitude produced from said averaging means, said comparing means producing first and second outputs when the former is larger and smaller than the latter, respectively; and means for applying said first and second outputs to said computing means which responsively retards or advances, respectively said ignition position.

2. An apparatus according to claim 1, wherein said averaging means comprises a rectifier circuit for rectifying said knock signals, an integrator for averaging the output of said rectifier circuit by integrating the same, and an amplifier for amplifying the output of said integrator.

3. An apparatus according to claim 1, wherein said averaging means includes a voltage doubler rectifying-averaging circuit for rectifying and averaging said knock signal and an amplifier for amplifying the output of said voltage doubler rectifying-averaging circuit.

4. An apparatus for controlling a timing of ignition sparks supplied to an internal combustion engine having an output shaft comprising:

computing means for (a) computing an ignition position in accordance with an operating condition of said internal combustion engine, and (b) providing an ignition signal synchronized with the arrival of said output shaft at said ignition position so computed;

knock detecting means for producing knock signals having magnitudes proportional to respective intensities of knocks of said internal combustion engine;

averaging means for averaging the magnitudes of said knock signals and providing an average magnitude signal related thereto;

monostable multivibrator means responsive to said ignition signal for generating a pulse signal having a predetermined pulse duration synchronized with the occurrence of said ignition signal;

interval control means for limiting the operation of said averaging means to a constant period of time defined by said pulse signal generated by said monostable multivibrator means said constant period of time being independent of the angle of output shaft rotation made by the engine therein;

comparing means for comparing the magnitudes of said knock signals with said average magnitude signal provided by said averaging means, said comparing means producing first and second outputs when the former is larger and smaller than the latter, respectively; and means for applying said first and second outputs to said computing means which retards and advances said ignition position in response thereto, respectively.

5. An apparatus according to claim 4, wherein said averaging means comprises:

switch means controlled by said monostable multivibrator means for passing said knock signals during said predetermined pulse duration of said pulse signal; and holding means for holding a peak level of said knock signals passed through said switch means so that said average magnitude is produced therefrom.

6. An anti-knock ignition timing apparatus for deviating the ignition timing of an engine from its nominal ignition timing comprising:

computing means for computing said nominal ignition timing based upon at least one engine operating parameter and providing an ignition signal related thereto;

a knock detector for detecting the magnitude of knock of said engine and generating a knock signal indicative thereof;

first means responsive to said ignition signal for sampling said knock signal during a first interval of time established with respect to engine ignition to establish an average base knock level and generate a base signal indicative thereof;

second means responsive to said ignition signal for establishing a second interval of time beginning after the end of said first interval of time; and comparing means for comparing the magnitudes of said base signal and said knock signal and for generating (a) an advance signal throughout said second interval of time, and (b) a retard signal when said knock signal exceeds said base signal, indicating the presence of a knock condition, said advance and retard signals being coupled to said computing means for advancing and retarding said nominal ignition timing established by said computing means, whereby the ignition timing of said engine is advanced until a knock condition is established and then retarded until a no-knock condition is established.

7. An anti-knock ignition timing apparatus according to claim 6 wherein said first means comprises monostable multivibrator means for generating pulses having a width establishing said first interval of time, said pulses being synchronized with said ignition signal.

8. An anti-knock ignition timing apparatus according to claim 6 wherein said second means comprises monostable multivibrator means for generating pulses having a width establishing said second interval of time, said pulses synchronized with said ignition signal.

9. An anti-knock ignition timing apparatus according to any of claims 6, 7, or 8 wherein said first means further includes averaging means for averaging the magnitude of said knock signal over said first interval of time to establish said base signal.

10. An anti-knock ignition timing apparatus according to claim 9 wherein said averaging means comprises a voltage doubler rectifying averaging circuit for rectifying and averaging said knock signal over said first interval of time and an amplifier for amplifying the output of said voltage doubler rectifying averaging circuit.

11. An anti-knock ignition timing apparatus according to claim 9 wherein said averaging means comprises switch means for passing said knock signal during a period corresponding to said first interval of time and holding means for holding a peak level of said knock signal passed through said switch means so as to produce said base signal.

* * * * *